United States Patent [19]

Korzeniewski

[11] 4,146,264
[45] Mar. 27, 1979

[54] LOAD CONTROL FOR WIND-DRIVEN ELECTRIC GENERATORS

[75] Inventor: Eugene C. Korzeniewski, Willingboro, N.J.

[73] Assignee: Louis Michael Glick, Cumberland, Md.

[21] Appl. No.: 882,871

[22] Filed: Mar. 2, 1978

[51] Int. Cl.² .............................................. F03D 9/00
[52] U.S. Cl. ...................................... 290/44; 322/35; 322/31; 290/55
[58] Field of Search ...................... 290/44, 55; 322/35, 322/31, 29

[56] References Cited

U.S. PATENT DOCUMENTS

| 2,118,124 | 5/1938 | Weeks | 290/44 |
| 2,152,576 | 3/1939 | Weeks | 290/44 |
| 3,974,395 | 8/1976 | Bright | 290/44 |

Primary Examiner—Robert K. Schaefer
Assistant Examiner—John W. Redman
Attorney, Agent, or Firm—George A. Smith, Jr.

[57] ABSTRACT

In a wind-driven generator system, the generator load curve is matched to the wind-driven rotor characteristic by an electronic field current control which is responsive to the rotor speed. A tachometer circuit produces pulses the repetition rate of which is proportional to rotor speed. The pulses are counted in a predetermined time interval, and a stepwise control of field current is effected in accordance with the count. Switching from the first step, in which field current is zero, to the second step, in which field current is relatively high, takes place at a count which is spaced by intermediate counts from the count at which switching takes place from the second step to the first step.

6 Claims, 4 Drawing Figures

LOAD CONTROL FOR WIND-DRIVEN ELECTRIC GENERATORS

BRIEF SUMMARY OF THE INVENTION

This invention relates to wind-driven electric generators, and particularly to improvements in electronic load controls for matching a generator load curve to a wind-driven rotor characteristic for optimum efficiency.

In generating electric power by means of wind-driven generators, it is difficult to attain optimum efficiency because of a combination of factors. First, wind speed always varies unpredictably. Secondly, typical generator load curves are incompatible with the characteristic curves of typical wind-driven rotors. As a result, a simple system in which a wind-driven rotor is arranged to drive a generator is, at best, optimally efficient only at one particular wind velocity.

It can be shown, for example, that, using a given alternator having a constant field excitation in combination with a multiple-blade wind-driven rotor, if the rotor diameter is relatively large, the generating efficiency of the system approaches a maximum as wind speed increases from zero to a given velocity, and efficiency then drops off with further increases in speed. On the other hand, if the size of the rotor blades, or the number of blades, is decreased, a condition is reached where the torque produced by the wind-driven rotor is insufficient to overcome the load presented by the generator. When this occurs, the generator cannot increase in speed as wind speed increases. Consequently, generator speed is necessarily low, and the system cannot take advantage of the increased power available in high winds. In either case, the rotor-generator system is inefficient because it does not take full advantage of available wind power at all times. Copending application Ser. No. 735,003, filed Oct. 22, 1976 by Kevin E. Moran and Eugene C. Korzeniewski now U.S. Pat. No. 4,095,120, describes an electronic apparatus for matching a generator load curve to a wind-driven rotor characteristic by means of a rotor speed-responsive tachometer effecting stepwise control of field current in the generator. The apparatus for controlling the loading of the generator in that system comprises means for sensing the rotational speed of the generator and providing a signal, the amplitude of which varies as a function of said rotational speed, and control means, responsive to said signal, for controlling the current in the field winding in accordance with the rotational speed of the generator whereby the load imposed by the generator closely follows but does not substantially exceed the available power from the rotor through a wide range of rotational speeds. The sensing and signal-providing means comprise means for establishing at least four speed ranges, the speed ranges together constituting said wide range of rotational speeds, and means for establishing, for each of said speed ranges, a predetermined amplitude for said signal. These predetermined amplitudes are different for adjacent ranges (though two non-adjacent amplitudes can be identical to each other). The control means comprises an amplifier connected to receive said signal as an input, and has its output connected to deliver current to the field winding. The means for sensing rotational speed of the generator comprises means for providing a series of pulses the repetition rate of which is proportional to the rotational speed of the generator, means for repetitively establishing a predetermined time interval, counting means for repetitively counting the number of pulses occurring in said predetermined time interval, and means for establishing the predetermined amplitude for the signal for each speed range in dependence on the count in the counting means.

The basic speed-sensing circuitry comprises a monostable multivibrator, a counter, and a latching circuit which acts as a temporary memory for the count established by the counter. A first pulse in a series produced by the tachometer triggers the monostable multivibrator, which establishes a predetermined time interval during which the counter is operative. At the end of the predetermined time interval, when the monostable circuit returns to its stable condition, the count in the counter, which is proportional to rotor speed, is transferred to the latch, and the condition of the outputs of the latch is used to produce a signal which is sent to the controller to establish a field current level corresponding to the count. The field current remains at this level until the end of the next timing interval, when a new count is transferred to the outputs of the latch.

Various types of monostable multivibrators can be used to establish the predetermined time interval during which pulses are counted. However simple monostable circuits having only one stage of timing, i.e. one RC circuit performing the timing function, exhibit widely varying "on" times because the switching points in their gates vary from chip to chip. The variation in "on" times necessitates the use of a variable calibration resistor having a wide range of adjustment, which makes accurate calibration difficult. With two stages of timing, however, the "on" time can be made less dependent on inherent gate characteristics, and a calibration resistor can be chosen which is adjustable over a relatively narrow range, permitting more accurate calibration.

Monostable multivibrators with two stages of timing require a certain minimum trigger pulse width for proper timing. Indeed, all monostable multivibrators require a certain minimum trigger pulse width for reliable operation. However, the tachometer pulses produced in response to generator rotation may not all have sufficient width to trigger the monostable circuit properly. The width of the trigger pulse can be increased by various means. However, widening of the tachometer pulses may cause other problems, for if a tachometer pulse occurs at the end of a timing interval, just before the monostable circuit returns to its stable state, it can extend the duration of the unstable state. Extension of the duration of the unstable state does not directly degrade the performance of the monostable circuit, but it does introduce a potential ambiguity in the calibration of the monostable circuit.

The transfer of the count in the latching circuit must take place during the stable state of the monostable circuit before the counter is reset at the onset of the next timing interval. Since the outputs of the counter do not respond immediately to the counted pulses, it is necessary to introduce a delay in the operation of the latch. If the counter is reset before the transfer of information takes place, an erroneous result will occur. Therefore, in the basic circuit described above, if a tachometer pulse occurs immediately after the transition of the monostable circuit back to its stable state, the monostable circuit will be retriggered, and the pulse width at its output, i.e., the duration of the stable state, may be insufficient for proper operation of the counting and latching circuitry.

It is an object of the invention to eliminate one or more of the above-mentioned problems. In accordance with the invention, the tachometer pulses are delivered first to a bistable multivibrator, and the monostable circuit is triggered by the output of the bistable multivibrator. The bistable multivibrator is, in turn, reset by an output from the monostable circuit through a delay circuit. This insures that the pulse which triggers the monostable circuit will have an adequate width for proper operation of the monostable circuit. The bistable device is also connected to be responsive to the state of the monostable circuit in such a way that when the monostable circuit is in its unstable condition, after the delay imposed by the delay circuit occurs, the bistable device is returned to and held in its initial condition, and prevents tachometer pulses from extending the duration of the unstable state of the monostable device. Still another connection is made between the monostable device and the bistable device through a delay circuit, which prevents retriggering of the monostable device for a short period following its return to its stable state.

Another problem in the basic digital speed sensing circuit arises by reason of the fact that, while in the low speed range, the desired field current is substantially zero, the desired field current in the next-to-lowest speed range may be quite high. Consequently, when a shift occurs from the lowest to the next-to-lowest range, a load which is suddenly imposed on the wind-driven rotor slows the rotor down and causes switching of the control circuitry back to the zero current condition. Consequently, an oscillatory mode of operation can occur under certain conditions. This problem is attacked in copending application Ser. No. 735,003 in an embodiment in which speed levels are determined by analog comparison of voltage levels rather than by counting. It is an object of the present invention to eliminate the oscillatory mode of operation just described by novel means in a speed sensing circuit of the pulse counting type. This object is achieved in accordance with the present invention by providing means, responsive to the count in the counting means, for establishing a predetermined signal amplitude for the next-to-lowest speed range, during increases in speed from the lowest to the next-to-lowest speed range, only when the count in the predetermined interval reaches a predetermined count exceeding the minimum count for the next-to-lowest speed range, and for preventing reestablishment of the predetermined signal amplitude for the lowest speed range until the count in the counting means for the predetermined time interval corresponds to the lowest speed range. In effect, as the rotor speeds up, field current shifts from zero to the level corresponding to the next-to-lowest speed range, only when the rotor speed is well into the next-to-lowest speed range. As the rotor slows down, it must return all the way to the lowest speed range before the field current is switched back to the zero level.

In the basic speed sensing circuit a number of conditions can give rise to an improper setting of the latch, i.e., to a condition in which the count recorded in the latch corresponds to a speed range other than the lowest speed range, while the rotor is not moving. Ordinarily, this would result in excessive current in the field winding, and could damage the generator by overheating. Such conditions could occur, for example, upon the initial application of operating voltage to the circuit. For example, multiple voltage spikes might arise by the connection of a wire to the battery terminal, and these spikes could effect undesired operation of the counter and transfer in the latch even though the rotor is not turning. The same effect could be induced by lightning or by high-intensity man-made electromagnetic radiation. A sudden stoppage of the rotor can also result in an improper condition of the latch. All of these conditions could result in excessive field current. It is an object of the invention to insure that the field current will correspond to the lowest speed range when the rotor is either not rotating or rotating at extremely slow speeds. In accordance with the invention, this objective is achieved in a novel manner by providing means for initiating a new timing interval when the count in the latch corresponds to a speed range other than the lowest speed range, when no tachometer pulses are present. The new timing interval is initiated after a delay longer than the longest interval between successive initiations of the timing for speed ranges other than the lowest speed range. Thus, if the rotor is not rotating, and no tachometer pulses are being produced, and the latch is in a condition corresponding to a speed range other than the lowest speed range, a new timing interval is automatically initiated, and if the number of pulses counted in this interval is zero or some other count corresponding to the lowest speed range, the latch condition is reset so that its outputs correspond to the lowest speed range. The resetting of the latch occurs in the same manner as in normal operation of the circuit, i.e., in response to shift of the monostable timing multivibrator to its stable state. It is not necessary to provide special circuitry for resetting the counter and latch when the rotor is not rotating.

Various other objects and advantages of the invention should be apparent from the following detailed description, when read in conjunction with the drawings.

DETAILED DESCRIPTION

Figure 1:
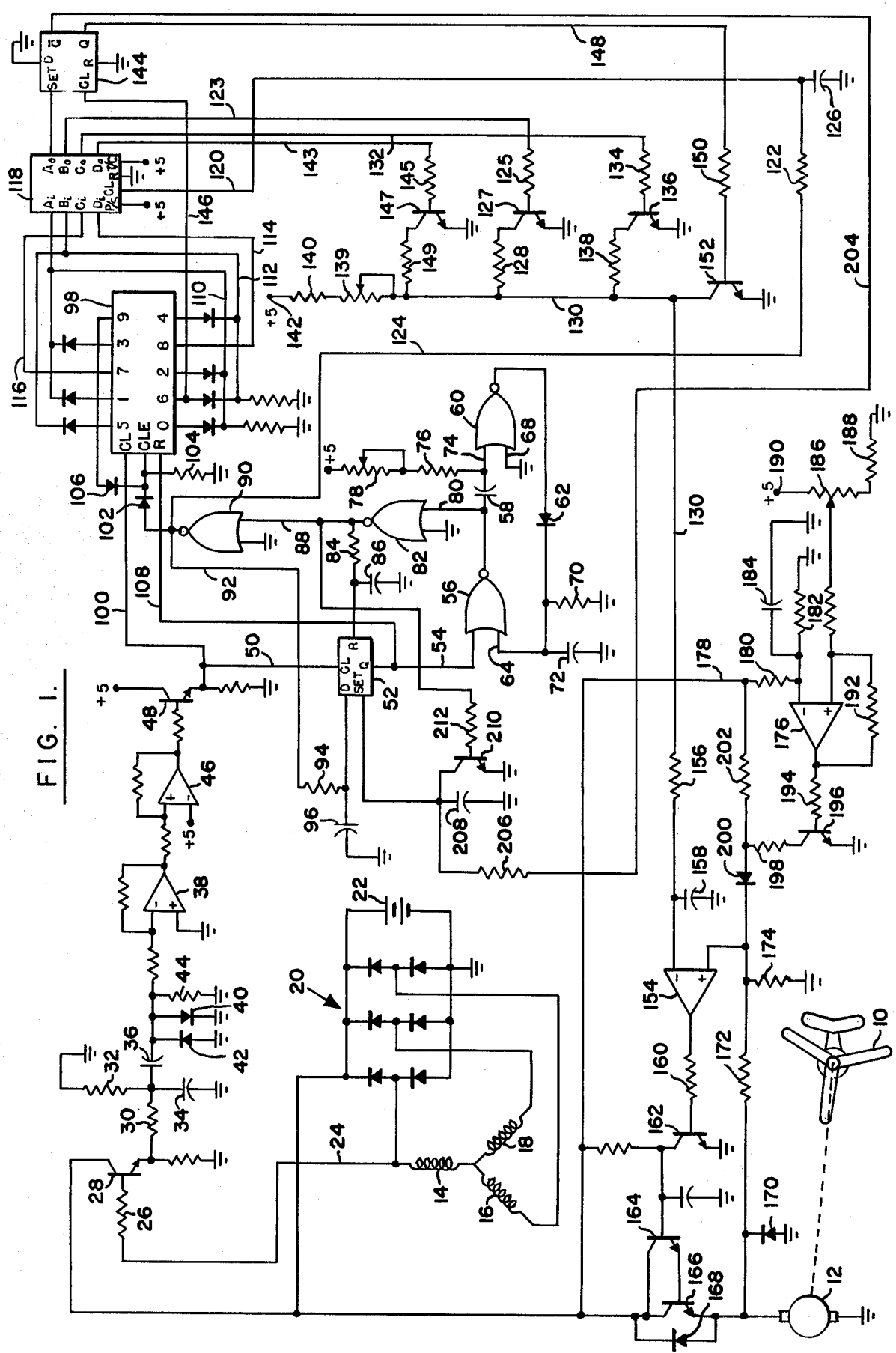
FIG. 1 is a schematic diagram of a speed sensing and field current control circuit in conjunction with a wind-driven alternator.

Referring to FIG. 1, a three-bladed wind-driven rotor 10 is shown. The rotor is preferably of the type described in U.S. Pat. No. 4,025,233, dated May 24, 1977. The wind-driven rotor drives an alternator, which comprises a rotor 12, and a set of three armature windings 14, 16 and 18 arranged in a "Y" configuration. The armature windings produce a three-phase alternating current which is rectified by diode array 20, through which the armature windings are connected to storage battery 22.

In general, the apparatus depicted in FIG. 1 senses the rotational speed of the alternator by counting pulses produced in the armature, and controls the delivery of current to the field winding in rotor 12 in such a way as to make the most effective use of the available wind power.

Figure 2:
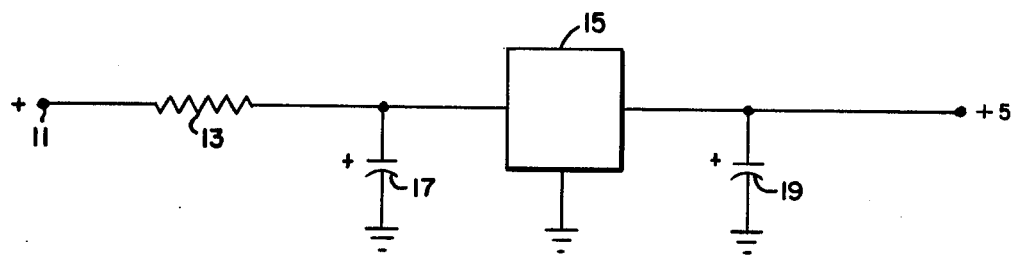
FIG. 2 is a schematic diagram of a power supply for use in conjunction with the circuit of FIG. 1.

The terminals in FIG. 1 labelled "+5" are powered through the power supply circuit of FIG. 2, in which terminal 11 is connected to the positive side of the battery and a resistor 13 is connected between terminal 11 and then input side of an integrated circuit regulator 15. Smoothing capacitors 17 and 19 are provided respectively at the input and output sides of the regulator. The regulator is preferably a National Semiconductor LM340T-5, five volt regulator.

Returning to FIG. 1, a connection is made through line 24 to deliver pulses from armature winding 14 to processing circuitry designed to deliver corresponding pulses to the logic circuitry of the apparatus. The repetition rate of these pulses is proportional to the speed of rotation of the rotor.

Pulses from line 24 are delivered through resistor 26 to the base of NPN transistor 28, which is connected as a high input impedance unity-gain buffer. The emitter-follower output of transistor 28 is delivered to a low pass filter comprising resistors 30 and 32 and capacitor 34. The output of the filter is coupled through capacitor 36 to operational amplifier 38, limiting diodes 40 and 42 and resistor 44 being connected in shunt, following capacitor 36. Operational amplifier 38 is preferably one of four operational amplifiers in a National Semiconductor LM324 quad. The output of amplifier 38 is connected to a Schmitt trigger 46 which comprises another operational amplifier in the quad. The output of the Schmitt trigger is in turn connected to the base of NPN transistor 48, which acts as an interfacing buffer between the signal processing circuitry just described and the logic circuitry which follows.

The emitter-follower output of interface buffer transistor 48 is connected through line 50 the the clock input of a D-type flip flop 52 (which is typically one unit of a National Semiconductor CD4013C dual D flip flop). This flip flop (or bistable multivibrator) has independent data, set, reset and clock inputs, and both Q and Q̄ outputs. Only the Q output is used. In operation, upon the positive-going transition of a pulse at the clock input, the logic level presented at the D input is transferred to the Q output. Setting or resetting are independent of the clock input, and are accomplished by the application of a high logic level at the set or reset inputs respectively.

The Q output of flip flop 52 is connected through line 54 to one of the inputs of a two-input NOR gate 56 (typically one gate of a National Semiconductor CD4001C quadruple two-input NOR gate). The output of gate 56 is connected through capacitor 58 to one of the inputs of a similar NOR gate 60. The output of NOR gate 60 is in turn connected through diode 62 to the remaining input 64 of gate 56. The second input 68 of gate 60 is grounded. Resistor 70 and capacitor 72 are connected in parallel between input 64 of gate 56 and ground. A positive five volt supply is connected to input 74 of gate 60 through the series combination of fixed resistor 76 and variable resistor ("potentiometer") 78.

The circuitry just described, comprising gates 56 and 60 and associated elements, constitutes a basic monostable multivibrator, operating upon the application of a positive-going pulse at line 54. The output of this monostable multivibrator is derived at line 80. In operation, line 80 is normally high (e.g. at +5 volts). When a pulse is applied at line 54 by the Q output of flip flop 52, line 80 shifts to a low condition, and this low is immediately transferred through capacitor 58 to input 74 of gate 60. The output of gate 60 in turn goes high, and causes input 64 of gate 56 to go high, thus holding line 80 at a logical low level irrespective of subsequent changes in the logic level of line 54. With line 80 held in the low condition by the output of gate 56, capacitor 58 begins to charge through resistors 76 and 78, and the voltage at input 74 of gate 60 slowly rises until gate 60 is triggered, and its output shifts to a low condition. Capacitor 72 then begins to discharge through resistor 70, and the voltage level at input 64 of gate 56 slowly decreases until the gate output at line 80 shifts back to its initial logical high.

Ordinarily, in order to count pulses in a predetermined time interval, a monostable multivibrator would be connected to be triggered by the first pulse, and its "on" state would determine the time interval during which successive pulses are counted. Several problems would arise in such a circuit, however. The presence of a trigger pulse at the input of the monostable multivibrator at the time when the multivibrator would otherwise return to its stable condition, would keep the multivibrator in its unstable state, and thus interfere with the production of an accurate timing interval during calibration. A second problem arises because the counting circuitry requires a certain minimum pulse width in order to respond properly. If a triggering pulse triggers the monostable circuit back to its unstable state immediately after it returns to its stable state, the pulse corresponding to the stable state may be insufficiently wide to permit settling of the counter output and subsequent transfer of information in the latching circuit before the counter is reset. Finally, with a monostable circuit of the type shown, if the trigger pulse (at line 54) is of insufficient duration, timing capacitor 72 may not receive a sufficient charge, before the end of the trigger pulse, to insure proper switching of the output of gate 56 to the low condition.

The foregoing problems are solved by the auxiliary circuitry associated with the basic monostable circuit. The output of the monostable circuit at line 80 is inverted by gate 82. The output of gate 82 is connected through resistor 84 to the reset input of flip flop 52. A shunt capacitor is provided at 86. When a first pulse arrives at the clock input of flip flop 52 through line 50, the Q output of flip flop 52 switches high, and the monostable circuit is triggered through line 54. At this time, the output of gate 82 goes high, but resetting of flip flop 52 is delayed because of the time required for capacitor 86 to charge through resistor 84. This time delay insures that the trigger pulse in line 54 will have a duration sufficiently long to insure sufficient charging of capacitor 72 before the end of the trigger pulse in line 54. The trigger pulse in line 54, however, is shorter than the longest period of the tachometer pulses when present at a rate corresponding to the maximum count in the counter. Otherwise, the pulse in line 54, which also resets the counter, could prevent the counting of a countable pulse. During the entire duration of the unstable state of the monostable circuit, the output of gate 82 remains high, holding the reset input of flip flop 52 high. The clock input is therefore disabled, and no pulse in line 50 can retrigger flip flop 52 until after the completion of the timing interval. Consequently, no pulse can occur in line 54 immediately prior to the end of the timing interval which would have the effect of lengthening the timing interval.

The output of gate 82 is connected through line 88 to a second inverter 90. The output of this inverter is connected through line 92 and resistor 94 to the D input of flip flop 52. A capacitor 96 is connected between the D input and ground. At the beginning of the timing interval, the output of gate 90 in line 92 switches from a high to a low condition, and capacitor 96 discharges through resistor 94. Capacitor 96 continues to discharge through the timing interval until the monostable circuit returns to its stable condition, whereupon the output of gate 90 returns to a high condition. At this time, capacitor 96 is sufficiently discharged to present a logical low at the D input of flip flop 52. Any pulse occurring in line 50 at this time will not result in a triggering pulse in line 54. Capacitor 96 recharges through resistor 94 after a short interval, again enabling flip flop 52. The short interval during which flip flop 52 is disabled, however, prevents immediate retriggering of the monostable circuit, and therefore insures a sufficient pulse width at the output of the monostable circuit to effect proper operation of the latching circuitry.

Figure 3:
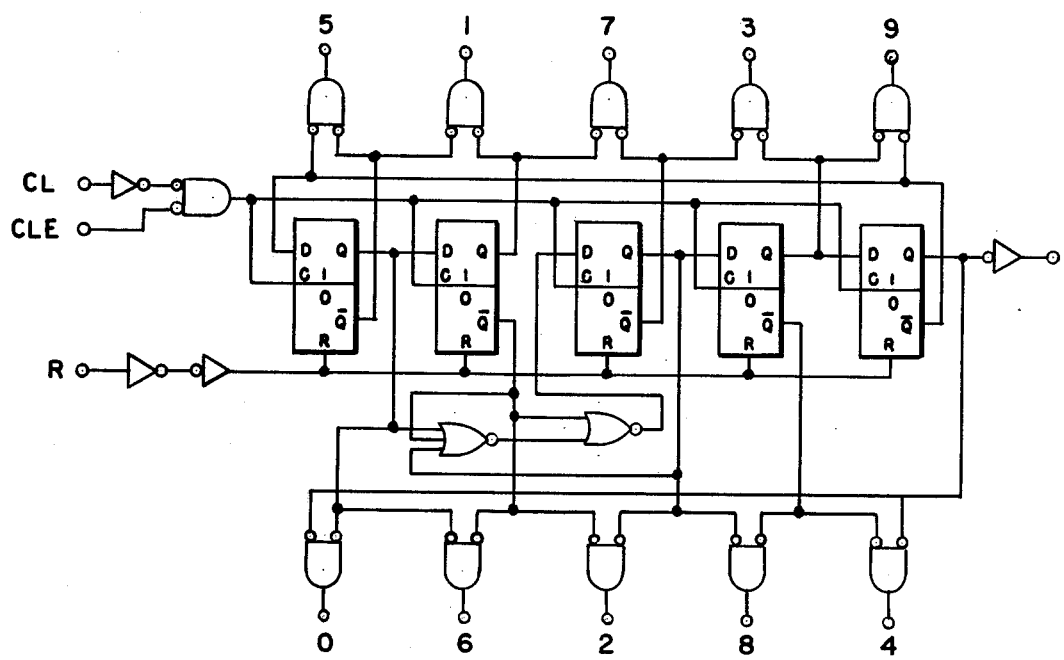
FIG. 3 is a schematic diagram showing the details of the counter of FIG. 1.

Counter 98 is a five stage, divide-by-10 counter having decoded (decimal) outputs. These decoded outputs are normally in the logical low state, and each shifts to a logical high state when its corresponding count is reached. The basic configuration of this counter is shown in FIG. 3, and it will be observed that the ten outputs, labeled "0" – "9" respectively, are repeated in FIG. 1, as are the clock input "CL", the clock enable input "CLE", and the reset input "R". A National Semiconductor CD4017C is suitable for use as counter 98.

The clock input CL of counter 98 is connected directly to the emitter of interface transistor 48 through line 100. The clock enable input CLE is connected through diode 102 to the output of inverter 90. Diode 102 is connected in a direction such that the counter is enabled when the output of inverter 90 is low, and is disabled when the output of inverter 90 is high. A resistor 104 is connected between the clock enable input of counter 98 and ground. An additional connection is made through diode 106 between the "9" output of counter 98 and the clock enable input CLE. Diode 106 is also in a direction such that counter 98 is disabled when the "9" output is high.

The reset input R of counter 98 is connected through line 108 to the Q output of flip flop 52, and causes resetting of the counter to zero when the Q output of flip flop 52 goes high.

The outputs of counter 98 are combined in groups by an arrangement of diodes. The "0", "1", "2" and "3" outputs are connected in common through isolation diodes to line 110. The "4", "5" and "6" outputs are similarly connected in common through isolation diodes to line 112. The "7" output is connected to line 116. The "8" output is connected to line 114.

Figure 4:
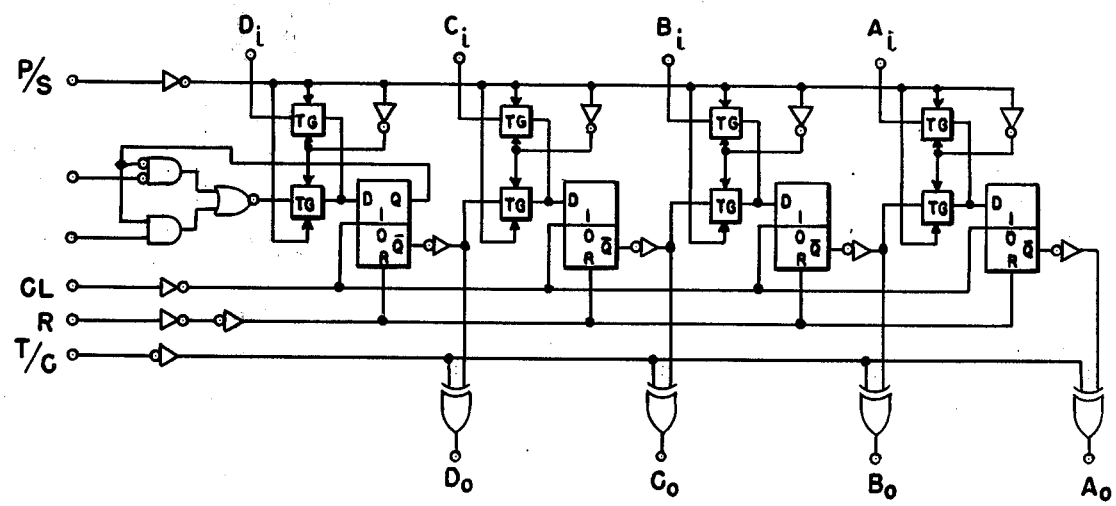
FIG. 4 is a schematic diagram showing the details of the latch of FIG. 1.

The grouped outputs of the counter are delivered to a four-bit parallel-in, parallel-out latch 118, the details of which appear in FIG. 4. While various types of parallel-in, parallel-out latches can be used, a four-bit shift register of the complementary MOS type, such as a National Semiconductor CD4035C is preferred. With this particular device, it is necessary to apply a positive supply voltage to the parallel-serial control (P/S) in order to permit data entry, and to apply a positive supply voltage to the true-complement control (T/C) to insure that the output bits correspond to the true contents of the register.

As shown in FIG. 1, the reset input R of latch 118 is grounded, and the clock input CL is connected through line 120, resistor 122 and line 124 to the output of inverter 90. A capacitor 126 is connected between line 120 and ground. Resistor 122 and capacitor provide the delay in the operation of the latch which is necessary to insure that the outputs of the counter have settled before transfer of information takes place in the latch.

The grouped outputs of counter 98 in lines 110 and 112 are connected respectively to the input connections $A_i$ and $B_i$ of the latch. The "7" output of the counter is connected through line 116 to the $C_i$ input of the latch, and the "8" output of the counter is connected through line 114 to the $D_i$ input of the latch.

The $B_O$, $C_O$ and $D_O$ outputs of latch 118, which correspond respectively to counts of 4, 5 and 6, counts of 7 and counts of 8, are connected to three shunting circuits which control current in the field winding of the generator. Output $B_O$ is connected through line 123 and resistor 125 to the base of NPN transistor 127, the emitter of which is connected to ground. The collector of transistor 127 is connected through resistor 128 to control line 130. The $C_O$ output of latch 118 is similarly connected through line 132 and resistor 134 to the base of NPN transistor 136. Again, the emitter of transistor 136 is grounded, and its collector is connected through resistor 138 to control line 130. The $D_0$ output of latch 118 is connected through line 143 and resistor 145 to the base of transistor 147, the emitter of which is grounded and the collector of which is connected through resistor 149 to line 130. Control line 130 is connected through variable resistor 139 and fixed resistor 140 to positive five volt supply terminal 142.

The $A_0$ output of latch 118 (corresponding to counts of zero, one, two and three) is connected to the set input of a D-type flip flop 144, which can be the other flip flop in the dual flip flop including flip flop 52. The D input and the reset input of flip flop 144 are grounded, and the clock input CL is connected directly to the "6" output of counter 98 through line 146. The Q output of flip flop 144 is connected through line 148 and resistor 150 the base of NPN transistor 152, the emitter of which is grounded, and the collector of which is connected directly to control line 130.

The amplification circuitry which controls field current in response to the signal level in line 130 will now be described. It comprises an operational amplifier 154 (which is preferably one of the four operational amplifiers in the quad including amplifiers 38 and 46). Control line 130 is connected through an averaging circuit comprising resistor 156 and capacitor 158 to the "minus" input of amplifier 154. The output of amplifier 154 is connected through resistor 160 to the base of NPN transistor 162. The collector of transistor 162 is connected to the base of transistor 164. Transistor 164 is connected in a Darlington configuration with transistor 166, and the emitter of transistor 166 is connected to one of the brushes of alternator rotor 12, the other brush being connected to ground. A protective diode 168 is connected between the collector and emitter of transistor 166.

Power for the amplification circuitry just described is derived from the positive side of battery 22 directly.

In operation, if the voltage level in control line 130 is substantially at zero, the output of amplifier 154 is positive, causing conduction of transistor 162 and cutting off the Darlington circuit comprising transistors 164 and 166. As the voltage in control line 130 increases, however, the output of amplifier 154 goes low, and the Darlington amplifier conducts current to the field winding of the alternator in rotor 12. Diode 170, which is connected across the field winding, protects the amplification circuitry from back e.m.f. induced in the field winding.

At low rotor speeds, when the control line voltage is substantially zero, it is desirable to maintain the field current as close to zero as possible by insuring that the Darlington pair 164, 166 is cut off completely. This is accomplished by resistors 202 and 198, which act together as a voltage divider to apply a small positive voltage through diode 200 to the "plus" input of amplifier 154. Resistors 202 and 198 are chosen so that this positive voltage is lower than the non-zero voltage produced at the junction of resistors 172 and 174 as a result of the voltage across the field winding. Whenever the field voltage is other than zero, then, diode 200 is reverse-biased, and the voltage at the junction of resistors 202 and 198 does not affect the field control circuit.

A feedback loop comprising series resistor 172 and shunt resistor 174 is connected between the emitter of transistor 166 and the "plus" input of amplifier 154 to insure that the voltage across the field winding in rotor 12 follows the voltage of the signal in control line 130. The voltage ratio between the control line and the field is determined primarily by the attenuation in the feedback path effected by resistors 172 and 174. The feedback loop also makes the field current substantially independent of variations in battery voltage.

The field current control circuitry also includes a voltage regulator circuit for setting the maximum voltage at the output of the generator. The main purpose of this voltage regulator is to prevent overcharging of the storage battery.

The voltage regulator comprises another operational amplifier 176, which can be part of the quad including amplifiers 38, 46 and 154. The "minus" input is connected to the positive terminal of battery 22 through line 178 and resistor 180. A shunt to ground is provided by resistor 182 and smoothing capacitor 184. Resistors 180 and 182 act as a dropping network, and apply to the minus terminal of amplifier 176 a voltage which is a fraction of the voltage appearing at the positive terminal of the battery. Capacitor 184 filters out any ripple in the generator output, and prevents such ripple from causing switching of the voltage regulator circuit. The plus terminal of amplifier 176 receives a regulated positive voltage from the wiper of variable resistor 186, which is connected in series with fixed resistor 188 between positive five volt terminal 190 and ground. A feedback resistor 192 is provided between the output of amplifier 176 and its "plus" input, and the output of amplifier 176 is also connected through resistor 194 to the base of transistor 196, the emitter of which is grounded, and the collector of which is connected through resistor 198 and diode 200 to the "plus" terminal of amplifier 154. A resistor 202 is connected between the upper end of resistor 198 and positive line 178.

The voltage regulator circuit just described senses the battery voltage in line 178, and compares this voltage with a reference produced at the wiper of adjustable resistor 186. So long as the battery voltage does not exceed the limit which is determined by the setting of resistor 186, the output of amplifier 176 is positive, and holds transistor 196 in conduction. Control amplifier 154 and the remaining amplifiers in the field control circuitry operate normally.

When the battery voltage exceeds a predetermined limit due to overcharging, transistor 196 is cut off by the output of amplifier 176, and a positive signal is applied through resistor 202 and diode 200 to the "plus" terminal of amplifier 154, whereupon transistor 162 conducts and transistor 166 is cut off, preventing the delivery of current to the field winding. The voltage regulation circuitry, therefore overrides the field current control circuit, and sets an upper limit on the battery voltage to prevent overcharging.

The application of field current to the generator field winding produces an electromagnetic drag on the wind-driven rotor, which tends to slow the rotor speed. Since the first increment of field current is quite large, the resultant slowing down of the rotor would ordinarily tend to produce continuous switching of the field current between the first and second steps. This condition is prevented by establishing a "hysteresis" effect which causes the signal in control line 130 to reach a predetermined amplitude corresponding to the second step (or the next-to-lowest speed range during increases in speed from the lowest to the next-to-lowest speed range) only when the count in the counting interval reaches a predetermined count exceeding the minimum count for the next-to-lowest speed range. In this case, the circuit requires the count to reach six before the amplitude of the signal in line 130 shifts to the amplitude corresponding to the next-to-lowest speed range. This is accomplished by the connection through line 146 between the six output of counter 98 and the clock terminal CL of flip flop 144. The application of a pulse to the clock terminal CL causes the Q output to shift to a low condition, cutting off transistor 152, which otherwise maintains the control line 130 essentially grounded. Transistor 152 cannot again go into conduction until the Q output of flip flop 144 goes high, which cannot occur until flip flop 144 is set by the application of a pulse to its set input from the $A_0$ output of latch 118. This can only occur when a count in the bottom range, i.e., zero - three, occurs. Consequently, for increases in rotor speed between the first and second speed ranges, the control level in line 130 cannot shift to a higher amplitude until the rotor reaches a speed corresponding to a count of six in counter 98, and the signal level in line 130 cannot return to the level corresponding to the lowest speed range until a count of zero, one, two or three occurs.

The hysteresis effect can be made to occur between any two speed ranges where the field current for the higher speed range is greater than the field current for the lower speed range. While only one flip flop (flip flop 144) is used in the circuit described, additional flip flops can be added to provide hysteresis between additional pairs of speed ranges.

The detailed operation of the counting and switching circuitry is as follows. When the system is at rest, the count in counter 98 is zero. Therefore, the $A_i$ input of latch 118 is high, and the remaining inputs of the latch are low. Outputs $B_0$, $C_0$ and $D_0$ of the latch are low, and output $A_0$ is high. This sets flip flop 144, causes its Q output to be high, and causes transistor 152 to conduct, clamping the control line 130 to ground. In successive counting intervals, established by operation of the monostable circuit, controlling the clock enable input CLE of counter 98, counts corresponding to the speed of the rotor are established. These counts are transferred to the output of the latch by the positive-going transition in line 120 which occurs at the end of the timing interval. When a count in the next-to-lowest range (four-six) occurs, the $A_0$ output of latch 118 goes low, thus presenting a low condition at the set input of flip flop 144. At this time, the clock input CL is enabled, and a transition of the state of flip flop 144 can occur when a high appears at the clock input. This occurs when the count of six is reached. At this point, the Q output of flip flop 144 goes low, and transistor 152 is cut off.

When transistor 152 is cut off, the control signal level in control line 130 is influenced by the conditions of transistors 127, 136 and 147. The states of these transistors depend in turn on the conditions of latch outputs $B_0$, $C_0$ and $D_0$. A high at output $B_0$, corresponding to the count of four - six, turns on transistor 127. A high at output $C_0$ corresponding to a count of seven, turns on transistor 136. A high at output $D_0$, corresponding to a count of eight, turns on transistor 147. When a count of nine is reached all of the outputs of latch 118 are low, and transistors 152, 136, 127 and 147 are all cut off. Thus, there are five possible conditions in line 130. In the first step, line 130 is clamped to ground through transistor 152. In the second step, transistor 152 is cut off and transistor 127 is conductive. The signal level in line 130 is controlled by the dropping network consisting of resistors 140 and 139, and resistor 128 and the emitter-collector circuit of transistor 127. In the third condition, transistor 152 remains cut off, and transistor 136 is conductive instead of transistor 127. Now, the signal level in line 130 is determined by resistors 140 and 139, resistor 138 and the emitter-collector circuit of transistor 136. In the fourth condition, transistors 127, 136 and 152 are all cut off, and transistor 147 is conductive, so that the signal level in line 130 is determined by the dropping network consisting of resistors 140 and 139 and resistor 149 and the emitter-collector circuit of transistor 147. In the fifth condition all of transistors 152, 136, 127 and 147 are cut off and the full voltage at terminal 142 is applied to line 130 through resistors 140 and 139.

Overheating of the field winding could occur if the rotor is stationary or moving too slowly while the control voltage in line 130 is in a non-zero condition. It is possible for this to occur, for example, when power is initially applied to the circuit. It would be possible to provide an automatic resetting circuit, which would reset all flip flops and counters to a starting condition when power is first applied. Resetting circuits, however, are normally characterized by time constant restrictions. For example, the power must be off for a length of time before it can be applied again in order for the automatic reset to function properly. In addition, such automatic reset circuits are not well suited for use in systems of this type in which power is likely to be applied by securing a lug onto a battery terminal instead of operating a switch. The waveform which occurs when power is applied can be quite erratic, so that an automatic reset circuit cannot be relied upon. System malfunctions could also be caused by abrupt stops in generator rotation, or currents induced in the circuit by lightning discharges or other source of electromagnetic radiation. Any of these conditions could result in the application of excessive field current, and would not be fully remedied by a conventional automatic resetting circuit.

In the circuit of FIG. 1, a connection is made through line 204 from the $\overline{Q}$ output of flip flop 144, and through a resistor 206 and a capacitor 208 to ground. The junction between resistor 206 and capacitor 208 is connected to the set input of flip flop 52. The emitter-collector circuit of transistor 210 is connected between this junction and ground, and the base of the transistor is connected through a resistor 212 to line 88 at the output of inverter 82.

If the control voltage in line 130 is non-zero, the Q output of flip flop 144 will be in a low condition, which means that the $\overline{Q}$ output, in line 204, will be high. This condition causes capacitor 208 to charge slowly through resistor 206 and flip flop 52 is eventually triggered to start a new timing interval. The time constant of resistor 206 and capacitor 208 is chosen so that the voltage at the set input of flip flop 52 reaches the triggering level within a time (e.g. 0.4 seconds) which exceeds the longest interval between successive transitions of the monostable circuit to the unstable state for rotor speed ranges other than the lowest range.

Whenever the Q output of flip flop 144 is high, signifying a non-zero condition of the control voltage in control line 130, capacitor 208 charges slowly, and if it reaches a level sufficient to trigger the said input of flip flop 52, the monostable circuit is triggered, and a count takes place. If the count is in the low range, i.e. zero - three, a high at the $A_i$ input of latch 118 is transferred to the $A_0$ output, flip flop 144 is set, its Q output goes high, and transistor 152 is switched to its conductive state, causing the control signal in line 130 to be clamped to ground. At the end of each timing interval, when the output of inverter 82 in line 88 goes high, a positive signal is delivered to the base of transistor 210, which conducts and discharges capacitor 208. Since the 0.4 second delay is longer than the longest interval between successive transitions of the monostable circuit to its unstable state, the operation of this circuitry does not interfere with the normal operation of the counting and timing circuits.

The apparatus therefore takes care of excessive field current conditions resulting from improper settings of digital elements due to switching transients or lightning, or resulting from stoppage of the rotor, by the novel method of automatically initiating a counting interval. It should be observed that the "set" input of hysteresis flip flop 144 must be high in order to cause transistor 152 to conduct. The method of initiating a new count accomplishes the setting of flip flop 144 in a very simple manner, since the counts of "zero", "one", "two" or "three" in the newly initiated counting interval automatically results in a high at the $A_0$ output of the latch which sets flip flop 144.

I claim:

1. In a wind-driven electric power plant comprising a wind-responsive rotor and a rotating electric generator connected to be driven thereby, said generator having an electrically energizable field winding, apparatus for controlling the loading of said generator comprising:
   means for sensing the rotational speed of said generator and providing a signal the amplitude of which varies as a function of said rotational speed; and
   control means, responsive to said signal, for controlling the current in said field winding in accordance with the rotational speed of said generator whereby the load imposed by the generator closely follows but does not substantially exceed the available power from said rotor through a wide range of rotational speeds;
   wherein said sensing and signal-providing means comprises means for establishing at least four speed ranges, said speed ranges together constituting said wide range of rotational speeds, and means for establishing for each of said speed ranges a predetermined amplitude for said signal, said amplitudes being different for adjacent ranges;

wherein said control means comprises amplification means connected to receive said signal as an input, and having its output connected to deliver said current to said field winding; and in which said means for sensing the rotational speed of said generator comprises means for providing a series of pulses the repetition rate of which is proportional to said rotational speed, means for repetitively establishing a predetermined time interval, counting means for repetitively counting the number of said pulses occurring in said predetermined time interval, and means for establishing said predetermined amplitude for said signal in dependence on the count in said counting means; and having means, responsive to the count in said counting means, for establishing the predetermined signal amplitude for at least one of said speed ranges, during increases in speed to said one of said speed ranges from a lower speed range, only when the count in said predetermined interval reaches a predetermined count exceeding the minimum count for said one of said speed ranges and for preventing reestablishment of the predetermined signal amplitude for said lower speed range until the count in said counting means for the predetermined time interval falls below said minimum count.

2. Apparatus according to claim 1 in which said means responsive to the count in said counting means comprises bistable means, means for maintaining said bistable means in a first stable state when the count for said predetermined interval corresponds to said lower speed range, means responsive to the condition of said bistable means for maintaining said signal at an amplitude corresponding to said lower speed range when said bistable means is in said first stable state, and means, responsive to said predetermined count exceeding the minimum count for said one of said speed ranges, for shifting said bistable means to its second stable state.

3. In a wind-driven electric power plant comprising a wind-responsive rotor and a rotating electric generator connected to be driven thereby, said generator having an electrically energizable field winding, apparatus for controlling the loading of said generator comprising:

means for sensing the rotational speed of said generator and providing a signal the amplitude of which varies as a function of said rotational speed; and control means, responsive to said signal, for controlling the current in said field winding in accordance with the rotational speed of said generator whereby the load imposed by the generator closely follows but does not substantially exceed the available power from said rotor through a wide range of rotational speeds;

wherein said sensing and signal-providing means comprises means for establishing at least four speed ranges, said speed ranges together constituting said wide range of rotational speeds, and means for establishing for each of said speed ranges a predetermined amplitude for said signal, said amplitudes being different for adjacent ranges;

wherein said control means comprises amplification means connected to receive said signal as an input, and having its output connected to deliver said current to said field winding; and in which said means for sensing the rotational speed of said generator comprises means for providing a series of pulses the repetition rate of which is proportional to said rotational speed, means for repetitively establishing a predetermined time interval, counting means for repetitively counting the number of said pulses occurring in said predetermined time interval, and means for establishing said predetermined amplitude for said signal in dependence on the count in said counting means; and in which said means for repetitively establishing a predetermined time interval comprises monostable multivibrator means connected to be triggered to its unstable state in response to a pulse of said series occurring when the multivibrator means is in its stable state, and means responsive to the state of said multivibrator means for preventing pulses which occur within the duration of the unstable state of the multivibrator means from extending the duration of said unstable state.

4. In a wind-driven electric power plant comprising a wind-responsive rotor and a rotating electric generator connected to be driven thereby, said generator having an electrically energizable field winding, apparatus for controlling the loading of said generator comprising:

means for sensing the rotational speed of said generator and providing a signal the amplitude of which varies as a function of said rotational speed; and control means, responsive to said signal, for controlling the current in said field winding in accordance with the rotational speed of said generator whereby the load imposed by the generator closely follows but does not substantially exceed the available power from said rotor through a wide range of rotational speeds;

wherein said sensing and signal-providing means comprises means for establishing at least four speed ranges, said speed ranges together constituting said wide range of rotational speeds, and means for establishing for each of said speed ranges a predetermined amplitude for said signal, said amplitudes being different for adjacent ranges;

wherein said control means comprises amplification means connected to receive said signal as an input, and having its output connected to deliver said current to said field winding; and in which said means for sensing the rotational speed of said generator comprises means for providing a series of pulses the repetition rate of which is proportional to said rotational speed, means for repetitively establishing a predetermined time interval, counting means for repetitively counting the number of said pulses occurring in said predetermined time interval, and means for establishing said predetermined amplitude for said signal in dependence on the count in said counting means; and in which said means for repetitively establishing a predetermined time interval comprises monostable multivibrator means connected to be triggered to its unstable state in response to a pulse of said series occurring when the multivibrator means is in its stable state, and means responsive to the state of said multivibrator means for preventing said multivibrator means from being retriggered to its unstable state during a predetermined interval following the return of said multivibrator means to its stable state.

5. In a wind-driven electric power plant comprising a wind-responsive rotor and a rotating electric generator connected to be driven thereby, said generator having an electrically energizable field winding, apparatus for controlling the loading of said generator comprising:

means for sensing the rotational speed of said generator and providing a signal the amplitude of which varies as a function of said rotational speed; and control means, responsive to said signal, for controlling the current in said field winding in accordance with the rotational speed of said generator whereby the load imposed by the generator closely follows but does not substantially exceed the available power from said rotor through a wide range of rotational speeds;

wherein said sensing and signal-providing means comprises means for establishing at least four speed ranges, said speed ranges together constituting said wide range of rotational speeds, and means for establishing for each of said speed ranges a predetermined amplitude for said signal, said amplitudes being different for adjacent ranges;

wherein said control means comprises amplification means connected to receive said signal as an input, and having its output connected to deliver said current to said field winding; and in which said means for sensing the rotational speed of said generator comprises means for providing a series of pulses the repetition rate of which is proportional to said rotational speed, means for repetitively establishing a predetermined time interval, counting means for repetitively counting the number of said pulses occurring in said predetermined time interval, and means for establishing said predetermined amplitude for said signal in dependence on the count in said counting means; and in which said means for repetitively establishing a predetermined time interval comprises monostable multivibrator means connected to be triggered to its unstable state in response to a pulse of said series occurring when the multivibrator means is in its stable state, and having bistable means normally in a first state and connected to be triggered by said pulse to a second state and having an output connected to trigger said monostable multivibrator means when said bistable means is triggered to its second state, said bistable means having a resetting input, and delay means connected to receive an output from said monostable multivibrator means and to deliver a resetting signal to the resetting input of said bistable means after a predetermined interval following the triggering of said monostable multivibrator to its unstable state.

6. In a wind-driven electric power plant comprising a wind-responsive rotor and a rotating electric generator connected to be driven thereby, said generator having an electrically energizable field winding, apparatus for controlling the loading of said generator comprising:

means for sensing the rotational speed of said generator and providing a signal the amplitude of which varies as a function of said rotational speed; and control means, responsive to said signal, for controlling the current in said field winding in accordance with the rotational speed of said generator whereby the load imposed by the generator closely follows but does not substantially exceed the available power from said rotor through a wide range of rotational speeds;

wherein said sensing and signal-providing means comprises means for establishing at least four speed ranges, said speed ranges together constituting said wide range of rotational speeds, and means for establishing for each of said speed ranges a predetermined amplitude for said signal, said amplitudes being different for adjacent ranges;

wherein said control means comprises amplification means connected to receive said signal as an input, and having its output connected to deliver said current to said field winding; and in which said means for sensing the rotational speed of said generator comprises means for providing a series of pulses the repetition rate of which is proportional to said rotational speed, means for repetitively establishing a predetermined time interval, counting means for repetitively counting the number of said pulses occurring in said predetermined time interval, and means for establishing said predetermined amplitude for said signal in dependence on the count in said counting means; and in which said control means establishes a substantially zero current in said field winding for the lowest of said speed ranges, said sensing means has memory means for holding the count of said counting means established in each said predetermined time interval until the end of the next predetermined time interval, and said means for establishing said predetermined amplitude for said signal is dependent on the count held in said memory means; and having means for initiating a new timing interval when the count in said memory corresponds to a speed range other than the lowest speed range, after a delay longer than the longest interval between successive initiations of the timing interval for speed ranges other than the lowest speed range, when no pulses of said series are present.

* * * * *

UNITED STATES PATENT AND TRADEMARK OFFICE
CERTIFICATE OF CORRECTION

PATENT NO. : 4,146,264
DATED : March 27, 1979
INVENTOR(S) : Eugene C. Korzeniewski It is certified that error appears in the above-identified patent and that said Letters Patent are hereby corrected as shown below:

Column 9, line 11, the word "lowest" should appear before "non-zero"

Column 11, line 58, "source" should read "sources"

Column 12, line 16, "Q" should read "$\overline{Q}$"

Signed and Sealed this

Ninth Day of October 1979

[SEAL]

Attest:

RUTH C. MASON
Attesting Officer

LUTRELLE F. PARKER
Acting Commissioner of Patents and Trademarks